United States Patent [19]
Kress

[11] Patent Number: 4,872,016
[45] Date of Patent: Oct. 3, 1989

[54] DATA PROCESSING SYSTEM FOR A PHASED ARRAY ANTENNA

[75] Inventor: Robert W. Kress, Saugerties, N.Y.

[73] Assignee: Grumman Aerospace Corporation, Bethpage, N.Y.

[21] Appl. No.: 240,960

[22] Filed: Sep. 6, 1988

[51] Int. Cl.[4] .............................. G01S 3/16; G01S 3/28
[52] U.S. Cl. .................................... 342/380; 342/383; 342/372
[58] Field of Search ....................... 342/380, 383, 372

[56] References Cited

U.S. PATENT DOCUMENTS

| | | | |
|---|---|---|---|
| 4,415,902 | 11/1983 | Redlich | 343/844 |
| 4,489,324 | 12/1984 | Blume | 342/372 |
| 4,516,126 | 5/1985 | Masak et al. | 342/383 |
| 4,736,460 | 4/1988 | Rilling | 342/380 |

*Primary Examiner*—Theodore M. Blum
*Attorney, Agent, or Firm*—Scully, Scott, Murphy & Presser

[57] ABSTRACT

A data processing system for a phased array antenna consisting of an array of transmit/receive elements which result in a significant reduction in the data processing requirements for the received signals. In operation, the RF transmitted and received beams are formed and steered in a conventional manner with a phase shifter and amplitude weighting for each element. However, a simplifying approximation is made in the signal processing of the received signals for interference suppression, which results in minimal degradation of the system performance. In such a system, interference suppression is obtained by generating nulls in the receive antenna pattern in the direction of the interference. The nulls are produced by adjusting the phase and amplitude (weight) of the received signal from each array element just enough to null the interference with minimal impact on the rest of the antenna pattern. Pursuant to the present invention, the signal processing requirements are significantly reduced by summing the outputs of adjacent array elements to produce a lesser number of summed signals, less than the number of elements in the array. Each summed signal is then directed to a weighted amplifier controlled to weigh the contribution of the particular summed signal to a composite output signal formed by a composite summing circuit, which sums the weighted output signals of all of the weighted amplifiers.

6 Claims, 2 Drawing Sheets

DATA PROCESSING SYSTEM FOR A PHASED ARRAY ANTENNA

BACKGROUND OF THE INVENTION

1. Field of the Invention

The present invention relates generally to a data processing system for reducing the data processing requirements for a phased array radar antenna, and more particularly pertains to a data processing system for reducing the data processing requirements for signals received by an electronically scanned radar antenna system formed by a linear array of endfire elements.

2. Discussion of the Prior Art

Ganz, et al. U.S. Pat. No. 4,336,543 discloses an electronically scanned antenna system having a linear array of endfire elements of the type for which the data processing system of the present invention was developed. In this antenna system, the endfire elements are laterally spaced between about 0.3λ to 0.9λ apart, preferably about 0.55λ apart, to enhance the effects of mutual coupling therebetween for broadening the radiation signal pattern of the elements in the plane of the array. Advantageously, the endfire elements may be of the Yagi type with each endfire element including a common reflector, a driver, and a plurality of directors. This provides an antenna array of very small elevation so as to be suitable for conformal installation on or within the airfoil surfaces of an aircraft, e.g., wing leading edges and the horizontal stabilizer trailing edge. Such a phased array antenna system offer tremendous surveillance and missile guidance capability with.. high levels of jam resistance at reduced weight, power and volume.

One of the major developmental and production problems associated with such conformal linear phased array radars is accomplishing the level of interference suppression processing required for the many transmit/-receive modules in the system array. Some current development work has focused on the UHF band at approximately 450 MHz. However, for some applications, operation at the L band, at approximately 900 to 1,200 MHz, is more desirable, but at the higher frequencies the relative signal processing requirement or load increases by a factor of two to three, or more, tending to mitigate against operation at the L band.

In conventional signal processing techniques for the signals received by each element of such a phased array antenna, the antenna is first operated to transmit, and by varying the transmitted gain and phase of each element module, the transmitted beam can be formed and steered in azimuth. Similarly, the receiver gain is varied, and the received signals phase shifted to match the transmitted beam pattern. In conventional signal processing techniques, the outputs of all of the element receivers are initially processed independently. In effect, the signal processing in the prior art was considered to be a function of the transmitted frequency, which determines the number of transmit/receive element modules required.

A conventional data processing technique would initially process separately the signal received from each of the twelve receive elements. Interference suppression is obtained by generating nulls in the receive antenna pattern in the direction of the interference. The nulls are produced by adjusting the phase and amplitude (weight) of the received signal from each array element just enough to null the interference with minimal impact on the rest of the antenna pattern. The extent that this can be accomplished depends upon the number of weights that are available for adjustment, usually referred to as the number of degrees of freedom.

If the phased array had twelve element modules therein, then twelve separate signal processing channels were required, each having a phase shifting circuit and a weighted amplifier controlled by an interference suppressor processor, and the twelve controlled signals were then summed to form a composite output signal. This technical approach resulted in a significant and burdensome signal processing requirement for the received signals.

SUMMARY OF THE INVENTION

Accordingly, it is a primary object of the present invention to provide a data processing system for a phased array antenna as described hereinabove which results in a significant reduction in the data processing requirements for the received signals.

The present invention greatly reduces the signal processing requirement at a given frequency. For example, operation at the L band could be accomplished, in effect, with a data processing requirement typical of the UHF band. Or a UHF system would have a reduced data processing requirement corresponding to that of a system with half the frequency or less.

Pursuant to the teachings of the present invention, the RF transmitted and received beams are formed and steered in a conventional manner with phase shifters and possible amplitude weighting in each module. However, a simplifying approximation is made in the signal processing for interference suppression, which results in minimal degradation of the system performance. Consider an array consisting of twelve L band elements. Conventional data processing would initially process separately the signal received from each of the twelve receive elements. Interference suppression is obtained by generating nulls in the receive antenna pattern in the direction of the interference The nulls are produced by adjusting the phase and amplitude (weight) of the received signal from each array element just enough to null the interference with minimal impact upon the rest of the antenna pattern. The extent that this can be accomplished depends upon the number of weights that are available for adjustment, usually referred to as the number of degrees of freedom.

In the subject invention, the necessary number of degrees of freedom are obtained with a major reduction in the signal processing over that of a conventional prior art system. An explanation of the process follows. If the twelve elements are regarded as points on a continuous curve of received signals along the array, it becomes apparent that a twelve point curve fit is substantially more than necessary to define adequately almost any function (twelve points yield an 11th power curve fit). In a radar system, the function is a radar beam with nulls in the side lobes for the interference. Therefore, it becomes possible to sum (average) the outputs from adjacent elements and describe the function with a lesser number of points. Summing each two adjacent outputs for the twelve element array results in a six point, 5th power curve fit as shown in FIG. 3. For a fifteen element array, each three adjacent outputs could be summed, resulting in a 5 point, 4th power curve fit. The extent to which the reduction in signal processing can be obtained depends upon the level of antenna pattern side lobes that can be tolerated and on the number of interference sources that are to be nulled.

In accordance with the teachings herein, the present invention provides a data processing system for an electronically scanned, phased array antenna radar system. Pursuant to the present invention, the signal processing requirements are greatly reduced by summing the outputs of adjacent array elements to produce a lesser number of summed signals, less than the number of elements in the array. Each summed signal is directed to a weighted amplifier controlled to weigh the contribution of that particular summed signal to a composite output signal formed by a composite summing circuit which sums the weighted output signals of all of the weighted amplifier.

The present invention relates to an electronically scanned antenna system having an array of transmit/receive elements. Electronic scanning as the term is used herein entails adjustment in the excitation coefficients (e.g., phase and amplitude) of the elements in the array in accordance with the direction in which the formation of a beam is desired. It is well known to those skilled in the art that the beam of an antenna points in a direction that is normal to its phase front. In phased arrays, the phase front is adjusted to steer the beam by individual control of the phase excitation of each radiating element. Phase shifters are electronically actuated to permit rapid scanning and are adjusted in phase to a value between 0 and $2\pi$ radians. While this method of electronic scanning is perhaps the most commonly used, other means may be employed to effect the same changes in the phase front of the array to produce steerage of the beam. Control of the excitation coefficients of the elements of the array is commonly known as "antenna feed", and includes all systems for independently or dependently controlling the amplitude and phase of the signals to or from the individual elements of the antenna array, and dividing or combining means therefor.

BRIEF DESCRIPTION OF THE DRAWINGS

The foregoing objects and advantages of the present invention for a data processing system for a phased array antenna may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
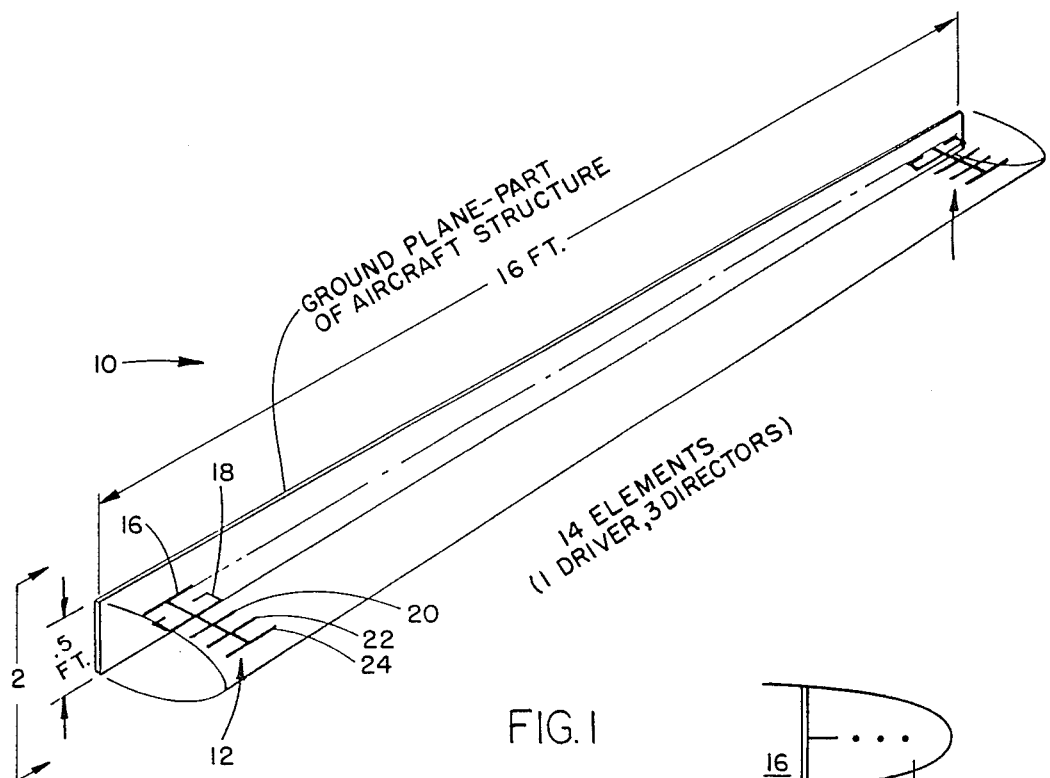
FIG. 1 illustrates a frontal perspective view of an aircraft wing radar array of fourteen transmit/receive modular elements.
Figure 2:
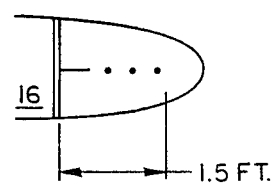
FIG. 2 is a left elevational view of the radar array of FIG. 1, taken along arrows 2—2 therein.
Figure 3:
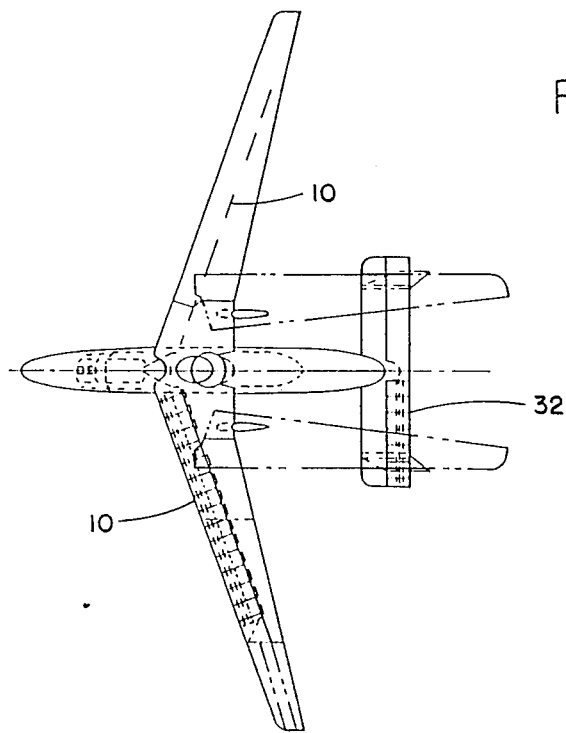
FIG. 3 is a top planar view of an aircraft having a conformal antenna array positioned in each of the wing leading edges, and also in the horizontal stabilizer thereof.

Referring to the drawings in detail, FIG. 1 illustrates a frontal perspective view of an aircraft wing conformal radar array 10 of fourteen transmit/receive modular elements 12 (two of which is shown), while FIG. 2 is a left elevational view thereof. FIGS. 1 and 2 give typical dimensions and numbers for a conformal phased linear array for an aircraft wing, such as is illustrated in FIG. 3. As is known in the art, a Yagi endfire element 12 includes at least two parasitic elements in addition to the driven element. The particular Yagi endfire element 12 illustrated in FIGS. 1 and 2 includes five conductive elements 16, 18, 20, 22, and 24. Such a multiparasitic array is known as a 5-element beam. Each element has a diameter of approximately $0.01\lambda$ and a length of approximately $0.5\lambda$.

The five elements 16, 18, 20, 22 and 24 are positioned in spaced parallel relationship along the same line of sight (transverse axis) with the spacing between the adjacent elements being approximately $0.25\lambda$. The five elements 16, 18, 20, 22 and 24 can be supported on a pair of non-conductive Plexiglas supports which electrically insulate the elements 16, 18, 20, 22, and 24 from one another, and advantageously are substantially invisible to the resulting electromagnetic waves.

Element 16 is the reflector element, element 18 the driven element, and elements 20, 22 and 24 the director elements. A coaxial cable is electrically coupled to the driven element 18 for providing an electrical signal thereto. The reflector 16 and directors 20–24 interact in a conventional manner to provide increased gain and unidirectivity to the radiated signal pattern.

FIG. 3 is a top planar view of an aircraft 30 having a conformal antenna array 10 positioned in each of its wing leading edges, and also in the horizontal stabilzer 32 thereof. With this arrangement 360° azimuthal coverage can be obtained by electronically scanning the arrays and conventional side-looking antennas mounted on opposite sides of the fuselage. Advantageously, such an arrangement avoids the need for a large dome mounted on the fuselage which must be mechanically rotated to provide the same 360° azimuthal coverage.

Figure 4:
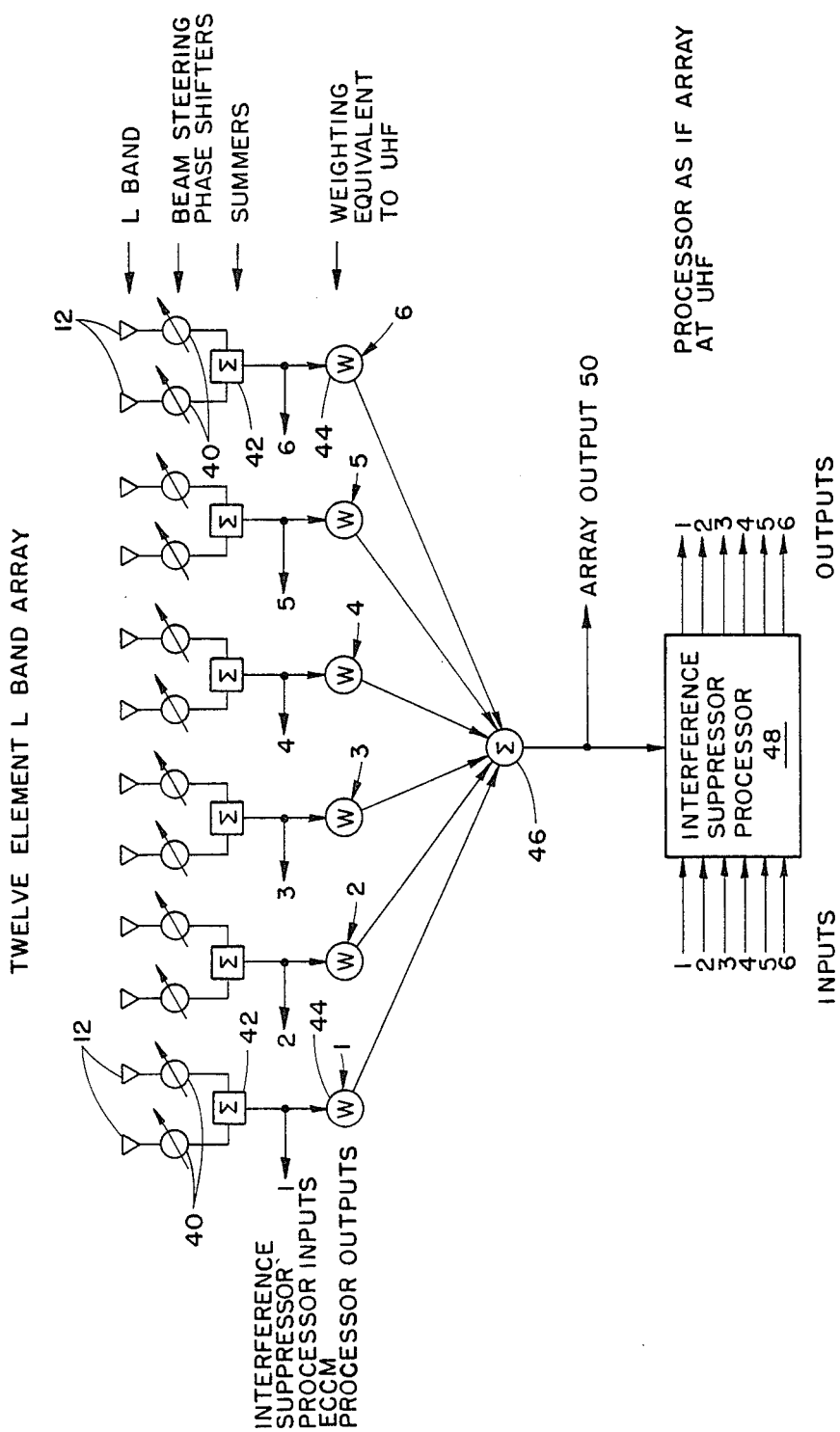
FIG. 4 illustrates a preferred embodiment of a signal receiver processor pursuant to the teachings of the present invention for reducing the signal processing requirements thereof relative to a conventional signal receiver processor.

FIG. 4 illustrates a preferred embodiment of a signal receiver processor pursuant to the teachings of the present invention which reduces the signal processing requirements relative to a conventional signal receiver processor. The system includes twelve transmit/receive elements 12 designed for operation in the L band at approximately 900 to 1200 MHz. By way of explanation, if the data signals from the twelve elements 12 are regarded as points on a continuous curve of received signals along the array, it is apparent that a twelve point curve fit is substantially more than is necessary to define adequately almost any function as twelve data points yield an 11th power curve fit. In the radar system, the function is a radar beam with nulls in the side lobes for the interference. Therefore, it is possible to sum or average the outputs from adjacent elements and describe the function with a lesser number of data points. Summing each two adjacent outputs for the twelve element array in a system as illustrated in FIG. 4 results in a six point, 5th power curve fit.

In the receiver processor, the gain and phase shift of the signals received by the elements 12 are controlled respectively by phase control circuits 40 and by controlled weighted amplifiers 44 to match the transmitted beam pattern. 10 Interference suppression is achieved by generating nulls in the received antenna pattern in the direction in which the interference is to be suppressed by adjusting the phase of the received signals in circuits 40 and the amplitudes in weighted amplifiers 44.

Pursuant to the teachings of the present invention, the signal processing requirements are significantly reduced by summing in summing amplifiers 42 the outputs of adjacent array elements to produce a number of summed signals, less than the number of elements in the array. Each summed signal is then directed to a weighted amplifier 44 controlled by an interference suppressor processor 48 in a manner as is known in this art to weigh the contribution of that particular summed signal to a composite output signal formed by a composite summing circuit 46 which sums all of the weighted output signals from all of the weighted amplifiers.

In alternative embodiments, greater or lesser numbers of signals can be combined and averaged. For instance, in a fifteen element array, each three adjacent outputs could be summed, resulting in a 5 point, 4th power curve fit. In general, the extent to which the reduction in signal processing can be obtained depends upon the level of antenna pattern side lobes that can be tolerated and upon the number of interference sources that are to be nulled.

While several embodiments and variations of the present invention for a data processing system for a phased array antenna are described in detail herein, it should be apparent that the disclosure and teachings of the present invention will suggest many alternative designs to those skilled in the art.

I claim:

1. A data processing system for an electronically scanned, phased array antenna radar system, comprising;
   a. an electronically scanned, phased array antenna comprising an array of n radiating and receiving elements, and a phase control circuit for each element, wherein the phase front of the antenna beam is controlled to steer the antenna beam by individually controlling the gain and phase excitation of each radiating element;
   b. a signal receiver, including an interference suppressor processor, for processing signals received by said phased array antenna, wherein the receiver controls the gain and phase shift of the signals received by the elements to match the transmitted beam pattern, and wherein interference suppression is achieved by generating nulls in the received antenna pattern in the direction in which the interference is to be suppressed by adjusting the elements, and wherein the signal processing requirements are reduced by, means for summing the outputs of the phase control circuits for adjacent array elements to produce a number of summed signals less than the number of elements in the array, and each summed signal being directed to a weighted amplifier controlled by said interference suppressor processor to weight the contribution of that particular summed signal to a composite output signal formed by a composite summing means for summing the weighted output signals of the weighted amplifiers.

2. A data processing system for an electronically scanned, phased array antenna radar system, as claimed in claim 1, each radiating and receiving element comprising an endfire element having a maximum gain along the longitudinal axis of that element.

3. A data processing system for an electronically scanned, phased array antenna radar system, as claimed in claim 1, comprising n/2 summing means for said n elements, and wherein signals from two adjacent elements are summed by each summing means.

4. A data processing system for an electronically scanned, phased array antenna radar system, as claimed in claim 1, comprising n/3 summing means for said n elements, and wherein signals from three adjacent elements are summed by each summing means.

5. A data processing system for an electronically scanned, phased array antenna radar system, as claimed in claim 1, comprising a phase adjusting circuit, coupled between each element and the summing means for that element, for controlling the phase of the signal from that element to the summing means for that element.

6. A data processing system for an electronically scanned, phased array antenna radar system, as claimed in claim 1, comprising an interference suppressor processor, having an input from each summing means and an input from said composite summing means, for processing the input signals and for supplying an output control signal to each weighted amplifier.

* * * * *